Patented Nov. 27, 1934

1,982,313

UNITED STATES PATENT OFFICE 1,982,313

HALOGENATED DIBENZANTHRONES

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application April 14, 1931, Serial No. 530,140. In Germany April 27, 1929

4 Claims. (Cl. 260—61)

The present invention relates to halogen derivatives of dibenzanthrone and isodibenzanthrone, especially to halogenated isodibenzanthrones which do not alter their shades when spotted with water, and to processes for their production.

We have found that halogenated derivatives of dibenzanthrones which term is meant to comprise also isodibenzanthrones which differ from the halogen derivatives produced according to the methods heretofore proposed with respect to the dyeings obtained therewith and especially with respect to their fastness to spotting with water, are obtained by halogenating derivatives of dibenzanthrone in an organic diluent by means of anhydrous metal halides supplying halogen, if desired in conjunction with a further halogenating agent, such as for example free halogen, or agents supplying halogen, such as sulphuryl chloride, iodine chloride and the like. As examples of metal halides which are especially suitable for carrying out the process according to the present invention may be mentioned the halides of iron, aluminium, antimony, mercury and the like and mixtures of these halides. As diluents which may be used according to our invention there may be mentioned halogen benzenes, halogen naphthalenes, benzophenone, nitrobenzene, quinoline, pyridine and collidine. Halogenating catalysts, for example metals or compounds thereof, or non-metals, for example iodine, sulphur or compounds thereof may be added to the reaction mixture.

In order to produce halogenated isodibenzanthrones fast to spotting with water, halogen and more particularly chlorine is introduced into the isodibenzanthrone molecule to such an extent that from 3 to 6, preferably from 3 to 5, and most suitably from 3 to 4, halogen atoms, in particular chlorine atoms are present per molecule. These products may also be obtained by carrying out the halogenation, in particular chlorination, in organic diluents by means of other halogenating agents than metal halides supplying halogen. The process making use of metal halides as the halogenating agents may be employed for the further halogenation of dibenzanthrones already containing halogen by introducing either further amounts of the halogen already present or a different halogen. Other derivatives of dibenzanthrone may also advantageously be halogenated by that process, for example nitro, amino, hydroxy, alkoxy and alkyl derivatives.

The following examples will further illustrate the nature of this invention, but the invention is not restricted thereto.

Example 1

62 parts of dibromdibenzanthrone, prepared by bromination of dibenzanthrone in chlorsulphonic acid, are heated to 140° C. in 2000 parts of trichlorbenzene while stirring. 480 parts of anhydrous iron chloride are introduced at this temperature and the reaction mixture is stirred at from 140° to 150° C. until a sample taken out yields a green-blue vat solution from which cotton is dyed shades which are fast to water. The reaction mixture is then allowed to cool and the trichlorbenzene is distilled off if desired with steam and/or under reduced pressure. The reaction product, which is obtained in excellent yields, dissolves in concentrated sulphuric acid giving a violet colouration and is a chlorbromdibenzanthrone. The navy-blue dyeings obtainable therewith from a green-blue vat have, in addition to very good general properties, the advantage, contrasted with the initial material that the shade is independent of the dyeing temperature. In spite of the introduction of chlorine the shade is changed towards green and moreover the dyeings have a fastness to drops of water which satisfies all practical requirements, i. e. they do not change to red when spotted with water. The crude dyestuff may be crystallized from organic solvents as for example nitrobenzene or from sulphuric acid, or may be purified by other methods as for example by treatment in the form of paste with oxidizing agents such as sodium hypochlorite.

The dyestuff may be converted into its leuco ester or into other leuco preparations according to the usual methods.

Example 2

31 parts of dibromdibenzanthrone are heated to 140° C. in 380 parts of trichlorbenzene while stirring and 90 parts of anhydrous iron chloride are added at this temperature and the reaction mixture is heated for several hours at from 140° to 150° C. When a sample taken out yields a greenish blue vat the reaction mixture is allowed to cool and is worked up as described in Example 1. The resulting dyestuff, which is a chlordibromdibenzanthrone, exhibits similar tinctorial behaviour to the reaction product obtained according to Example 1.

A similar dyestuff is obtained by the action of 100 parts of iron chloride or less iron chloride than stated above.

Example 3

30 parts of brominated dibenzanthrone (prepared from pure dibenzanthrone by bromination in nitrobenzene) are heated to 140° C. in 1500 parts of trichlorbenzene, 110 parts of anhydrous iron chloride then being added at this temperature. The reaction mixture is then stirred at from 140° to 150° C. until a sample taken out gives a green-blue vat and yields navy blue dyeings fast to water. The reaction mixture is then worked up as described in Example 1. The chlorbromdibenzanthrone, which is obtained in excellent yields, dissolves in concentrated sulphuric acid giving a violet colouration, it gives a green-blue vat and yields navy blue dyeings having excellent fastness on the vegetable fibre.

The preparation of the brominated dibenzanthrone and the further treatment of the same with iron chloride may also be carried out in one operation.

By treating isodibenzanthrone in trichlorbenzene with bromine and iron chloride a reaction product is obtained in an analogous manner which contains chlorine and bromine and which yields violet dyeings fast to drops of water and having very good fastness on cotton from green-blue vat.

Example 4

440 parts of anhydrous iron chloride are added while stirring at 140° C. to 62 parts of dibromisodibenzanthrone (prepared by bromination of pure isodibenzanthrone in an acid medium in the presence of a halogen transferrer) in 1500 parts of trichlorbenzene, and the reaction mixture is stirred for several hours at 150° C. When a sample taken out yields a green-blue vat, the reaction mixture is allowed to cool and is worked up as described in Example 1. The resulting chlordibromisodibenzanthrone is a violet powder which dissolves in concentrated sulphuric acid giving a green colouration and dyes cotton from a green blue vat clear powerful violet shades having very good fastness which practically no longer change to red when spotted with water.

Chlorbrom derivatives of isodibenzanthrone which give violet dyeings are obtained in an analogous manner from monobromisodibenzanthrone or tri-, tetra- and penta-bromisodibenzanthrone.

Example 5

78 parts of tetrabromdibenzanthrone, prepared by brominating pure dibenzanthrone in chlorsulphonic acid, are suspended in 2000 parts of trichlorbenzene, heated to 120° C. while stirring and 480 parts of anhydrous iron chloride are added at this temperature. The temperature is kept at from 140° to 150° C. until a sample taken out yields a pure green-blue vat solution. The reaction mixture is then worked up as described in Example 1. The resulting dyestuff, which is a tetrabromdibenzanthrone containing chlorine, dissolves in concentrated sulphuric acid giving a violet colouration and yields blue dyeings of excellent fastness on cotton.

In an analogous manner products containing more chlorine are obtained from dichlordibenzanthrone and reaction products containing chlorine and iodine are obtained from iododibenzanthrone.

Example 6

42.5 parts of tetrabrom-dichlordibenzanthrone (prepared from dibenzanthrone by brominating in chlorsulphonic acid in the presence of sulphur) are heated to 100° C. in 1000 parts of trichlorbenzene while stirring. After the addition of 240 parts of iron chloride the temperature is raised to from 145° to 150° centigrade and is kept constant for several hours. The reaction mixture is then allowed to cool and is worked up as described in Example 1. The reaction product, which is obtained in excellent yields, dyes substantially more greenish shades than the initial material. It dissolves in concentrated sulphuric acid to give a violet colouration.

Example 7

31 parts of dibromdibenzanthrone (prepared as described in Example 1) are boiled for several hours while stirring in 1000 parts of dichlorbenzene with 100 parts of mercury chloride. After cooling, the reaction mixture is worked up as described in Example 1. The reaction product containing chlorine is a violet-blue powder, it dissolves in concentrated sulphuric acid giving a violet colouration and yields navy blue dyeings fast to drops of water and having very good fastness on cotton from a green-blue vat.

A mixture of iron chloride and mercury chloride may be employed equally well instead of mercury chloride.

Dichlorbenzene may be replaced by other solvents or suspending agents as for example monochlorbenzene, trichlorbenzene or nitrobenzene.

Example 8

46 parts of pure dibenzanthrone are heated for two hours to from 140° to 150° C. in 1000 parts of trichlorbenzene after the addition of 2 parts of iodine and 32 parts of bromine. 240 parts of iron chloride are then added and the reaction mixture is kept at the same temperature for several hours. When the reaction is completed the reaction mixture is allowed to cool and is worked up as described in Example 1. The resulting dyestuff, which is a blue powder, dissolves in concentrated sulphuric acid giving a violet colouration, it yields a green-blue vat and has tinctorial properties similar to those of the reaction product described in Example 1. Instead of trichlorbenzene, nitrobenzene may equally well be used as the diluent.

Example 9

43 parts of pentabromdibenzanthrone (prepared from dibenzanthrone by bromination in chlorsulphonic acid in the presence of a metallic catalyst) are heated in 1000 parts of trichlorbenzene with 250 parts of antimony pentachloride for several hours at from 80° to 100° C. while stirring, and the reaction mixture is worked up in the usual manner after being cooled. The resulting dyestuff, which is a chlorpentabromdibenzanthrone, dissolves in concentrated sulphuric acid only with difficulty to give a violet colouration; it yields a green-blue vat and dyes cotton very fast blue shades.

Example 10

39 parts of tetrabromisodibenzanthrone are suspended in 1000 parts of nitrobenzene, and 240 parts of iron chloride are added to the suspension at 140° C. while stirring. The reaction mixture is then stirred for several hours at from 145° to 150° C., allowed to cool, and the chlorine-containing reaction product formed is isolated as described in Example 1. It is a blue powder which dissolves in concentrated sulphuric acid to give a violet colouration, it yields a green-blue vat and dyes cotton excellently fast navy blue shades.

Example 11

A suspension of 31 parts of dibromdibenzanthrone (prepared as described in Example 1) in 300 parts of collidine are heated while stirring to 120° centigrade, 240 parts of iron chloride are introduced, the temperature is raised to 150° C. and is kept constant for several hours. When a sample taken out yields dyeings similar to those of the dyestuff obtainable according to Example 1, the reaction mixture is allowed to cool and is worked up in the usual manner. The dyestuff which is obtained in excellent yields in the form of a blue powder dissolves in concentrated sulphuric acid giving a violet colouration and yields navy blue dyeings fast to drops of water and having very good fastness on cotton from a green-blue vat.

Example 12

40 parts of dibromdibenzanthrone (prepared as described in Example 1) are suspended in 200 parts of trichlorbenzene and heated to 140° centigrade while stirring. 100 parts of iron chloride and 50 parts of iron bromide are then added thereto and the reaction mixture is stirred for several hours at from 140° to 150° centigrade, allowed to cool and worked up in the manner described in Example 1. The resulting reaction product, which is a bromchlordibenzanthrone, dissolves in concentrated sulphuric acid giving a violet colouration, it yields a green-blue vat and dyes cotton fast blue shades.

Example 13

While stirring at from 130° to 140° C., 100 parts of iron chloride are introduced into a suspension of 20 parts of bromnitrodibenzanthrone (prepared by brominating nitrodibenzanthrone in nitrobenzene in the presence of iron) in 200 parts of trichlorbenzene. After the reaction mixture has been stirred for from 2 to 3 hours at from 120° to 130° C., it is allowed to cool and is worked up in the usual manner. The dyestuff thus obtained in the form of a blue powder, a chlorbromnitrodibenzanthrone, dissolves in concentrated sulphuric acid giving a red-violet colouration and dyes cotton from a blue vat fast navy blue shades.

Example 14

25 parts of bromaminodibenzanthrone prepared by brominating aminodibenzanthrone in nitrobenzene at 160° C., are suspended in 500 parts of trichlorobenzene, heated to between 110° and 120° C., whereupon 75 parts of anhydrous iron chloride are introduced in the course of 3 hours into the reaction mixture while stirring. The reaction mixture is then further heated at between 120° and 130° C. for a short time and worked up as usual. The chlorobromaminodibenzanthrone thus obtained dissolves in concentrated sulphuric acid giving a blue-violet solution and dyes cotton strong grey shades from a greenish-blue vat.

Example 15

25 parts of bromnitroisodibenzanthrone obtainable by brominating nitroisodibenzanthrone in nitrobenzene at 160° C. are treated in trichlorobenzene with iron chloride and worked up as described in the foregoing example. The chlorobromnitroisodibenzanthrone thus obtained is a violet powder, dissolves in concentrated sulphuric acid to give a green solution and dyes cotton from a blue vat strong reddish blue shades.

Example 16

50 parts of bromaminoisodibenzanthrone obtainable by brominating aminoisodibenzanthrone in nitrobenzene at 160° C. are treated with iron chloride and worked up as described in Example 14. The dyestuff thus obtained, a chlorobromaminoisodibenzanthrone, dissolves in concentrated sulphuric acid to give a green solution and dyes cotton from a blue vat fast reddish blue shades.

Example 17

46 parts of pure isodibenzanthrone are heated for from 5 to 6 hours to between 95° and 100° C. in 460 parts of nitrobenzene with an addition of 5 parts of ferric chloride, while introducing a current of chlorine. When a sample taken out has a chlorine content of 22 per cent or more, the reaction mass is allowed to cool and the product which has separated in a crystalline state is filtered off by suction. It dissolves in anhydrous sulphuric acid giving an olive green solution and dyes the vegetable fibre from a greenish blue vat violet shades which do not change to a more reddish tinge when spotted with water.

Similar results are obtained when employing antimony pentachloride or aluminium chloride instead of ferric chloride.

Example 18

92 parts of isodibenzanthrone are mixed gradually in 2000 parts of trichlorobenzene at between 80° and 100° C. with 650 parts of ferric chloride, whereupon the reaction mixture is heated for several hours to between 145° and 150° C. until the reaction is complete, as results from the disengagement of hydrochloric acid ceasing practically completely. The reaction mass is worked up in the usual manner. The resulting chloro derivative of isodibenzanthrone which contains from 4 to 5 atoms of chlorine per molecule, is similar in its properties to the reaction product described in Example 17.

A reaction product dyeing similar shades is obtained by heating isodibenzanthrone in nitro benzene with from 5 to 6 parts of antimony pentachloride.

Example 19

52 parts of 6,6'-dichloroisodibenzanthrone are heated for a short time to 175° C. in 700 parts of nitrobenzene with an addition of 200 parts of antimony pentachloride while stirring, whereupon the temperature is increased for some time to 195° C., and finally the mass is boiled for a short time. After cooling, the reaction product of which an excellent yield is obtained, is filtered off by suction. It is in the form of crystalline needles having a bronze lustre which dissolve in fuming sulphuric acid giving a green solution and which dye the vegetable fibre from a blue vat strong violet blue shades which do not become more reddish when spotted with water.

Similar reaction products are obtained in this manner from other synthetically prepared isodibenzanthrones or from isodibenzanthrones prepared by direct chlorination for example in chlorosulphonic acid or in nitrobenzene and containing less than 3 atoms of chlorine per molecule.

Example 20

62 parts of dibromo-isodibenzanthrone obtainable by brominating isodibenzanthrone are slowly heated to 200° C. in 600 parts of nitrobenzene together with 250 parts of antimony pentachloride; the reaction mass is kept for several hours at the said temperature, and after cooling the product is worked up in the usual manner. The resulting product containing chlorine and bromine is a violet blue powder which dissolves in concentrated sulphuric acid giving a green solution and which dyes the vegetable fibre from a greenish blue vat bluish violet shades which are not substantially altered when spotted with water.

This application is a continuation in part of our copending application Ser. No. 447,108, filed April 24, 1930.

What we claim is:

1. The process of producing chloroisodibenzanthrones which comprises treating 6,6'-dichloroisodibenzanthrone with antimony pentachloride in nitrobenzene at a temperature between 175° C. and the boiling point of the solution, until the reaction product contains at least 3 atoms of chlorine per molecule.

2. Chlorinated isodibenzanthrones which contain between 3 and 6 atoms of chlorine per molecule, of which chlorine atoms two are in the 6 and 6' positions, and which dye the vegetable fibre violet shades which do not become substantially more reddish when spotted with water.

3. Chlorinated isodibenzanthrones which contain between 3 and 6 atoms of chlorine per molecule, of which chlorine atoms two are in the 6 and 6' positions, and which dye the vegetable fibre violet shades which do not become more reddish when spotted with water, the said products being obtainable by heating 6,6'-dichloroisodibenzanthrone with antimony pentachloride in nitrobenzene at temperatures between 175° C. and the boiling point of the solution.

4. Chlorinated isodibenzanthrones which contain between 3 and 4 atoms of chlorine per molecule, dissolve in anhydrous sulphuric acid giving an olive green solution and dye the vegetable fibre from a greenish blue vat violet shades which do not become more reddish when spotted with water, said products being obtainable by heating pure isodibenzanthrone in nitrobenzene with ferric chloride and chlorine to between 95° and 100° C.

MAX ALBERT KUNZ.
KARL KOEBERLE.
ERICH BERTHOLD.